(12) United States Patent
Vincent

(10) Patent No.: US 8,725,898 B1
(45) Date of Patent: May 13, 2014

(54) SCALABLE PORT ADDRESS TRANSLATIONS

(75) Inventor: Pradeep Vincent, Kenmore, WA (US)

(73) Assignee: Amazon Technologies, Inc., Reno, NV (US)

(*) Notice: Subject to any disclaimer, the term of this patent is extended or adjusted under 35 U.S.C. 154(b) by 533 days.

(21) Appl. No.: 13/050,853

(22) Filed: Mar. 17, 2011

(51) Int. Cl.
*G06F 15/16* (2006.01)
*H04L 29/12* (2006.01)

(52) U.S. Cl.
CPC ................................. *H04L 29/1233* (2013.01)
USPC ........................... 709/245; 709/238; 709/246

(58) Field of Classification Search
CPC .................................................. H04L 29/1233
USPC ......................................... 709/238, 245, 246
See application file for complete search history.

(56) References Cited

U.S. PATENT DOCUMENTS

| | | | | |
|---|---|---|---|---|
| 6,993,595 | B1* | 1/2006 | Luptowski et al. | 709/245 |
| 7,318,100 | B2* | 1/2008 | Demmer et al. | 709/229 |
| 8,289,968 | B1* | 10/2012 | Zhuang | 370/392 |
| 2002/0116502 | A1* | 8/2002 | Iyer et al. | 709/227 |
| 2003/0093691 | A1* | 5/2003 | Simon et al. | 713/201 |
| 2004/0243703 | A1* | 12/2004 | Demmer et al. | 709/224 |
| 2004/0264449 | A1* | 12/2004 | Klaghofer et al. | 370/389 |
| 2008/0320154 | A1* | 12/2008 | Demmer et al. | 709/229 |
| 2009/0147795 | A1* | 6/2009 | Mevissen et al. | 370/401 |
| 2009/0157888 | A1* | 6/2009 | Demmer et al. | 709/229 |

OTHER PUBLICATIONS

How the 'Net works: An Introduction to Peering and Transit; Rudolph van der Berg; dated Sep. 2, 2008.
VL2: A Scalable and Flexible Data Center Network; Albert Greenberg, et al.; dated Aug. 2009.
Cisco Policy Based Routing White Paper; accessed Jun. 7, 2010.
Internet Security Systems, Distributed Denial of Service Attack Tools; accessed Jun. 7, 2010.
B. Pfaff, et al., Extending Networking into the Virtualization Layer, Proceedings of the 8th ACM Workshop on Hot Topics in Networks (HotNets—VIII), New York City, New York (Oct. 2009).
A. Greenberg, et al., Towards A Next Generation Data Center Architecture: Scalability and Commoditization, dated Aug. 22, 2008.
P. Barham, et al., Xen and the Art of Virtualization, SOSP'03, Oct. 19-22, 2003.
P. Srisuresh et al., Traditional IP Network Address Translator (Traditional NAT), The Internet Society, Jan. 2001.

* cited by examiner

*Primary Examiner* — Mohamed Wasel
(74) *Attorney, Agent, or Firm* — Knobbe, Martens, Olson & Bear, LLP

(57) ABSTRACT

A system and method for performing address translation for packets entering or leaving a network. In some embodiments, a private network that may be fully or partially virtualized can use a stateless tunneling mechanism to communicate with external networks, such as the Internet, without using an external IP address for every host on the private network. For example, a packet forwarding device using a stateless Port Address Translation (PAT) implementation can route the packets subject to PAT by using forwarding rules rather than by storing connection-tracking state. Connection state information can be maintained at the hosts rather than at the packet forwarding device.

30 Claims, 4 Drawing Sheets

SCALABLE PORT ADDRESS TRANSLATIONS

BACKGROUND

With the introduction of virtualization technology, a computing service provider can now provide computing resources to customers dynamically or in a scalable manner. As the computing resource demands of the customer increase, the computing service provider can allocate additional computing resources. Such resources can be provided to the customer as part of a virtual network connectable to the customer's own physical network. These computing resources can be provided to a customer transparently, without the customer's knowledge of where on an associated physical network such a resource exists. However, these computing resources may be represented to the customer as virtual network components, such that the customer has the illusion of having sole access to the computing resource.

Generally, computing devices on a network are distinguished using addresses, such as IP addresses. These addresses are used to route communications between these computing devices. For example, computing devices use Internet Protocol (IP) addresses to distinguish between computing devices in a network.

BRIEF DESCRIPTION OF THE DRAWINGS

Throughout the drawings, reference numbers are re-used to indicate correspondence between referenced elements. The drawings are provided to illustrate embodiments of the inventions described herein and not to limit the scope thereof.

DETAILED DESCRIPTION

Figure 1:
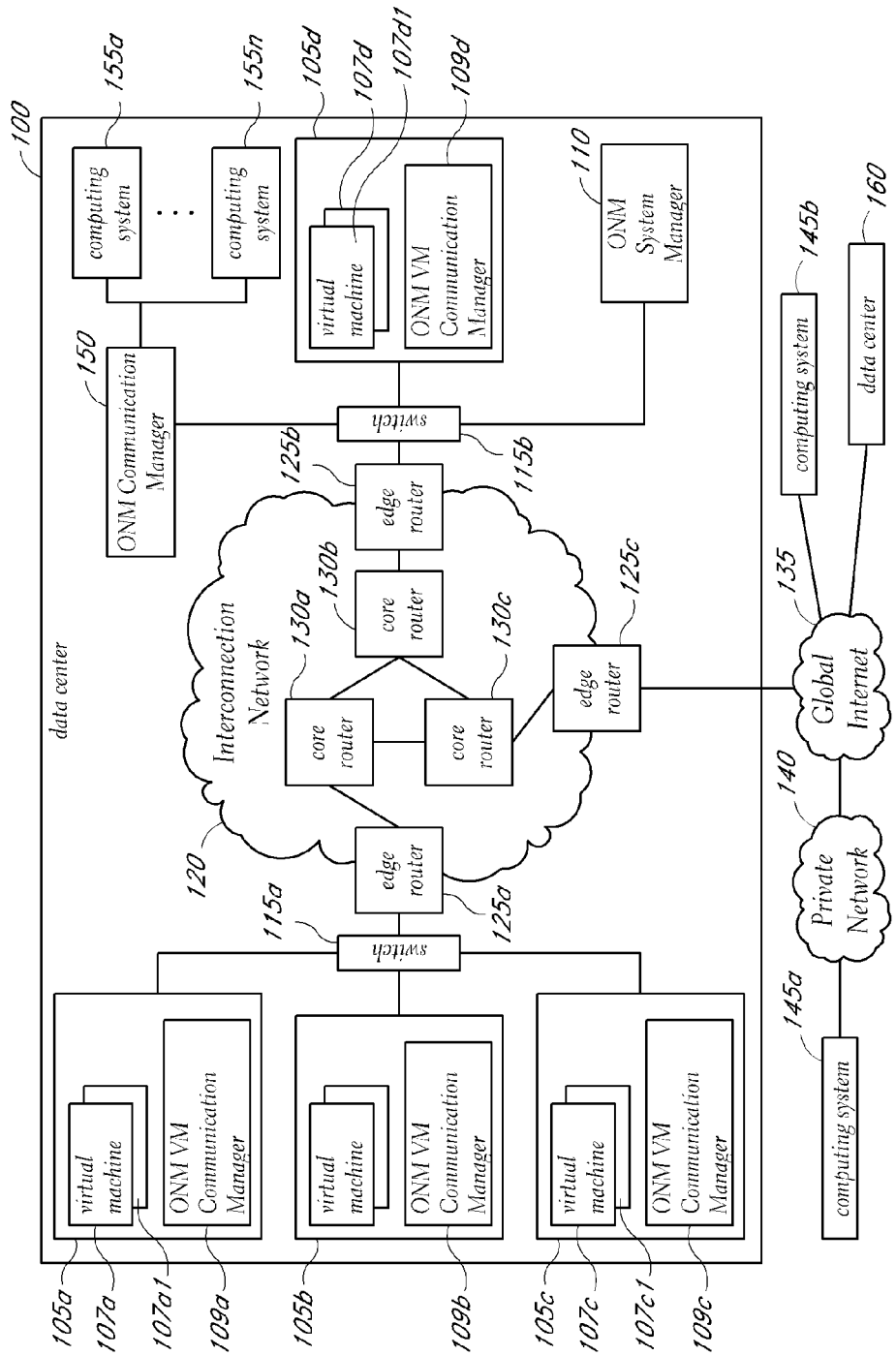
FIG. 1 is a network diagram schematically illustrating an embodiment of a computing network comprising an overlay network manager (ONM) system for managing computing nodes.

In this disclosure, techniques are described for performing address translation for packets entering or leaving a network. In some embodiments, a private network that may be fully or partially virtualized can use a stateless tunneling mechanism to communicate with external networks, such as the Internet, without using an external IP address for every host on the private network. For example, a packet forwarding device using a stateless Port Address Translation (PAT) implementation can route the packets subject to PAT by using forwarding rules rather than by storing connection-tracking state. Connection state information can be maintained at the hosts rather than at the packet forwarding device.

By offloading connection state tracking from the packet forwarding device and performing the connection state tracking at a remote device, the scalability of a packet forwarding device fleet may be enhanced. As less data may be stored or less processing power used, packet forwarding devices with lesser capabilities can be used. For example, cheaper forwarding devices may be used, thus allowing the deployment of larger fleets for the same cost. Ease of deployment may also be improved as additional packet forwarding devices can be added to the network without having to account for the current connection state of hosts on the network. Reliability or performance of the network may also be improved by removing or reducing any particular single packet forwarding device as a failure point or bottleneck. For example, if a first packet forwarding device goes down, traffic can be handled by a second packet forwarding device if no state is maintained by the first packet forwarding device. Load balancing may also be easier to implement as network traffic can be handled by a pool of packet forwarding devices rather than handled by a particular packet forwarding device.

Generally, PAT is used in situations where there are a limited number of public IP address and a large number of private hosts connecting through the public addresses, where the number of private hosts are greater than the available public IP addresses. Using PAT, incoming packets from the public network are routed to their destinations on the private network by reference to a table or other data store which keeps track of public and private port pairs. For example, a Transmission Control Protocol (TCP), User Datagram Protocol (UDP) or other Transport Layer protocol packet contains a source IP address and a source port number as well as a destination IP address and a destination port number. The port address/IP address pair forms a socket or an endpoint of a bidirectional inter-process communication flow across an Internet Protocol-based computer network, such as the Internet.

Commonly used ports for publicly accessible services such as web servers and mail servers include port 80 for connection to web server software and port 25 for connecting to a mail server. Both IP address and port, which form a socket address, are generally used in order to communicate over the IP network. In PAT, the sender's private IP and port number are modified for outgoing packets, with the PAT device providing the port numbers and IP address which will be seen by hosts on the public network.

With the advent of virtualization technologies, networks and routing for those networks can now be simulated using commodity hardware. For example, virtualization technologies such as those provided by VMware, XEN, or User-Mode Linux can be adapted to allow a single physical computing machine to be shared among multiple virtual networks by providing one or more virtual machines simulated in software by the single physical computing machine, with each virtual machine acting as a distinct logical computing system. In addition, as routing can be accomplished through software, additional network setup flexibility can be provided to the virtual network in comparison with hardware-based routing. For example, hosts on a virtual network, which may be instantiated using virtual machine instances, can be used to store connection information, thereby offloading processing or storage from packet forwarding devices.

Figure 2:
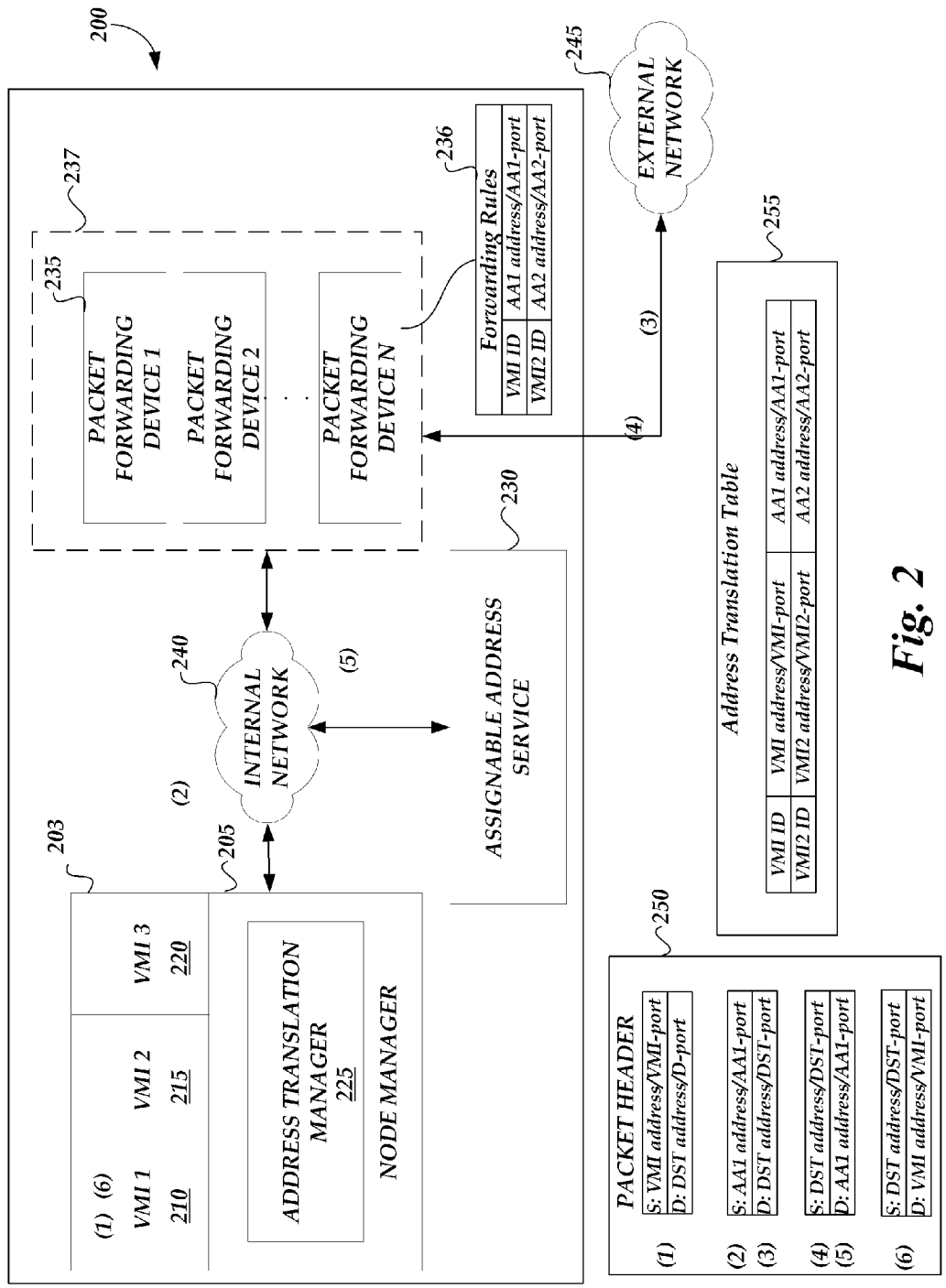
FIG. 2 is a block diagram schematic of illustrative components of an embodiment of an address translation system, which may be a portion of the ONM system described in FIG. 1.
Figure 3:
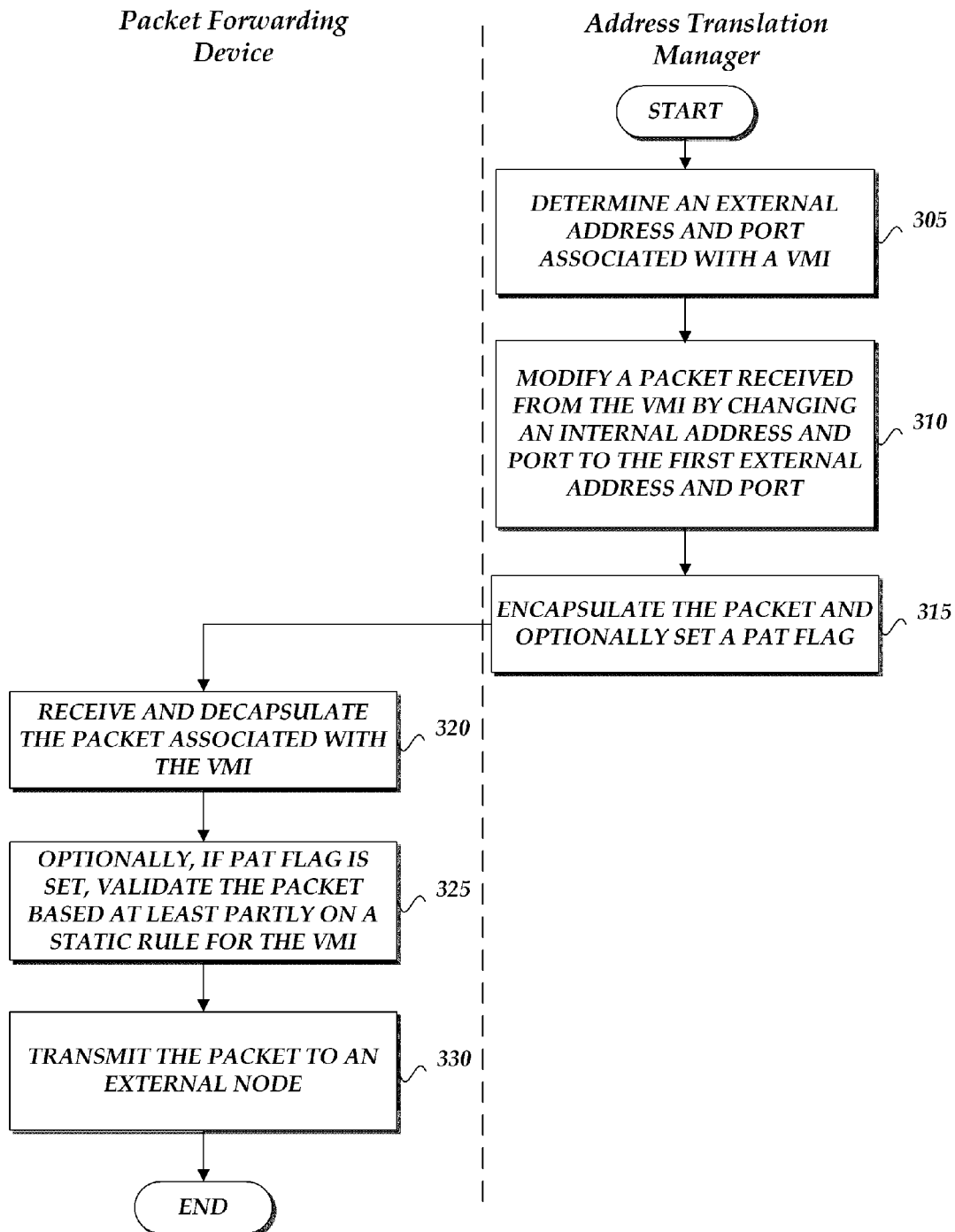
FIG. 3 schematically illustrates a flow diagram for an embodiment of a port address translation process for outgoing packets usable in the above systems.
Figure 4:
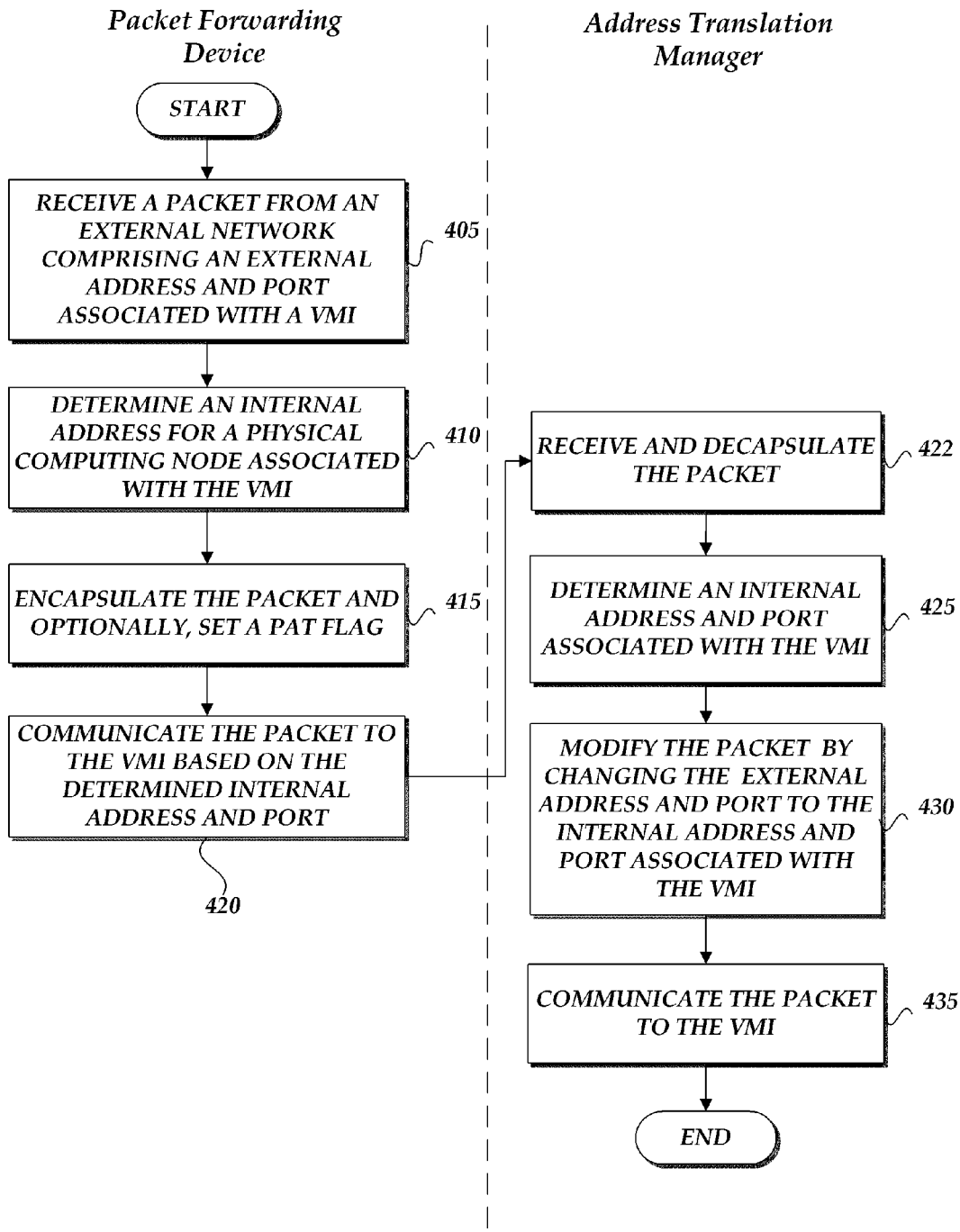
FIG. 4 illustrates a flow diagram for an embodiment of a port address translation process for incoming packets usable in the above systems.

By way of overview, FIG. 1 illustrates an embodiment of an overlay network manager (ONM) system for managing computing nodes FIGS. 2-4 discuss embodiments of address translation systems that perform port address translation remotely from packet forwarding devices. In some embodiments, the address translation system may be part of the ONM system.

Overlay Network Manager

FIG. 1 is a network diagram illustrating an embodiment of a computing network comprising an overlay network manager (ONM) system for managing computing nodes such as those associated with a computing resource provider for providing virtualized computing resources. For example, the computing nodes may be used to provide a virtual computer network to a plurality of customers. Virtual network communications can be overlaid on one or more intermediate physical networks in a manner transparent to the computing nodes. In this example, the ONM system includes a system manager module 110 and multiple communication manager modules 109a, 109b, 109c, 109d, and an ONM Communication Manager 150 to facilitate the configuring and managing communications on the virtual computer network.

The illustrated example includes an example data center 100 with multiple physical computing systems operated on behalf or as part of the ONM system. The example data center 100 is connected to a global internet 135 external to the data center 100. The global internet can provide access to one or more computing systems 145a via private network 140, to one or more other globally accessible data centers 160 that each have multiple computing systems, and to one or more other computing systems 145b. The global internet 135 can be a publicly accessible network of networks, such as the Internet, and the private network 140 can be an organization's network that is wholly or partially inaccessible from computing systems external to the private network 140. Computing systems 145b can be home computing systems or mobile computing devices that each connects directly to the global internet 135 (e.g., via a telephone line, cable modem, a Digital Subscriber Line ("DSL"), cellular network or other wireless connection, etc.).

The example data center 100 includes a number of physical computing systems 105a-105d and 155a-155n, as well as a Communication Manager module 150 that executes on one or more other computing systems to manage communications for the associated computing systems 155a-155n. The example data center further includes a System Manager module 110 that executes on one or more computing systems. In this example, each physical computing system 105a-105d hosts multiple virtual machine computing nodes and includes an associated virtual machine ("VM") communication manager module (e.g., as part of a virtual machine hypervisor monitor for the physical computing system). Such VM communications manager modules and VM computing nodes include VM Communication Manager module 109a and virtual machines 107a on host computing system 105a, and VM Communication Manager module 109d and virtual machines 107d on host computing system 105d. Physical computing systems 155a-155n do not execute any virtual machines in this example, and thus can each act as a computing node that directly executes one or more software programs on behalf of a user. The Communication Manager module 150 that manages communications for the associated computing systems 155a-155n can have various forms, such as, for example, a proxy computing device, firewall device, or networking device (e.g., a switch, router, hub, etc.) through which communications to and from the physical computing systems travel. In other embodiments, all or none of the physical computing systems at the data center host virtual machines.

This example data center 100 further includes multiple physical networking devices, such as switches 115a-115b, edge router devices, aggregation routers, or packet forwarding devices 125a-125c, and core router devices 130a-130c. Switch 115a is part of a physical sub-network that includes physical computing systems 105a-105c, and is connected to edge router 125a. Switch 115b is part of a distinct physical sub-network that includes physical computing systems 105d and 155a-155n, as well as the computing systems providing the Communication Manager module 150 and the System Manager module 110, and is connected to edge router 125b. The physical sub-networks established by switches 115a-115b, in turn, are connected to each other and other networks (e.g., the global internet 135) via an intermediate interconnection network 120, which includes the edge routers 125a-125c and the core routers 130a-130c. The edge routers 125a-125c provide gateways between two or more sub-networks or networks. For example, edge router 125a provides a gateway between the physical sub-network established by switch 115a and the interconnection network 120, while edge router 125c provides a gateway between the interconnection network 120 and global internet 135. The core routers 130a-130c manage communications within the interconnection network 120, such as by routing or otherwise forwarding packets or other data transmissions as appropriate based on characteristics of such data transmissions (e.g., header information including source or destination addresses, protocol identifiers, etc.) or the characteristics of the interconnection network 120 itself (e.g., routes based on the physical network topology, etc.).

The System Manager module 110, Communication Manager modules 109 and ONM Communication Manager 150 can configure, authorize, and otherwise manage communications between associated computing nodes, including providing logical networking functionality for one or more virtual computer networks that are provided using the computing nodes. For example, Communication Manager module 109a and 109c manages associated virtual machine computing nodes 107a and 107c and each of the other Communication Manager modules can similarly manage communications for a group of one or more other associated computing nodes. The Communication Manager modules can configure communications between computing nodes so as to overlay a virtual network over one or more intermediate physical networks that are used as a substrate network, such as over the interconnection network 120.

Furthermore, a particular virtual network can optionally be extended beyond the data center 100, such as to one or more other data centers 160 which can be at geographical locations distinct from the first data center 100. Such data centers or other geographical locations of computing nodes can be interconnected in various manners, including via one or more public networks, via a private connection such as a direct or VPN connection, or the like. In addition, such data centers can each include one or more other Communication Manager modules that manage communications for computing systems at that data. In some embodiments, a central Communication Manager module can coordinate and manage communications among multiple data centers.

Thus, as one illustrative example, one of the virtual machine computing nodes 107a1 on computing system 105a can be part of the same virtual local computer network as one of the virtual machine computing nodes 107d1 on computing system 105d. The virtual machine 107a1 can then direct an outgoing communication to the destination virtual machine computing node 107d1, such as by specifying a virtual network address for that destination virtual machine computing node. The Communication Manager module 109a receives the outgoing communication, and in at least some embodiments determines whether to authorize the sending of the outgoing communication. By filtering unauthorized communications to computing nodes, network isolation and security of entities' virtual computer networks can be enhanced. In some embodiments, the ONM system may allow specifying the expected network interactions of virtual machines independent of a distributed application's code. This can allow network administrators to protect sensitive assets independent of the application code. For example, traffic between virtual machines operating a distributed application can be routed through security nodes designated by the ONM system that analyze, filter or sanitize the traffic, even if the application code for the distributed application does not specify that behavior or specifies a different behavior. This could eliminate the need to perform expensive code audits, or it could prevent software designers and support engineers from undergoing security clearance.

The Communication Manager module 109a can determine the actual physical network location corresponding to the destination virtual network address for the communication. For example, the Communication Manager module 109a can determine the actual destination network address by dynamically interacting with the System Manager module 110, or can have previously determined and stored that information. The Communication Manager module 109a then re-headers or otherwise modifies the outgoing communication so that it is directed to Communication Manager module 109d using an actual substrate network address.

When Communication Manager module 109d receives the communication via the interconnection network 120, it obtains the virtual destination network address for the communication (e.g., by extracting the virtual destination network address from the communication), and determines to which virtual machine computing nodes 107d the communication is directed. The Communication Manager module 109d then re-headers or otherwise modifies the incoming communication so that it is directed to the destination virtual machine computing node 107d1 using an appropriate virtual network address for the virtual computer network, such as by using the sending virtual machine computing node 107a1's virtual network address as the source network address and by using the destination virtual machine computing node 107d1's virtual network address as the destination network address. The Communication Manager module 109d then forwards the modified communication to the destination virtual machine computing node 107d1. In at least some embodiments, before forwarding the incoming communication to the destination virtual machine, the Communication Manager module 109d can also perform additional steps related to security.

Further, the Communication Manager modules 109a or 109c on the host computing systems 105a and 105c can perform additional actions that correspond to one or more logical specified router devices lying between computing nodes 107a1 and 107c1 in the virtual network topology. For example, the source computing node 107a1 can direct a packet to a logical router local to computing node 107a1 (e.g., by including a virtual hardware address for the logical router in the packet header), with that first logical router being expected to forward the packet to the destination node 107c1 via the specified logical network topology. The source Communication Manager module 109a receives or intercepts the packet for the logical first router device and can emulate functionality of some or all of the logical router devices in the network topology, such as by modifying a TTL ("time to live") hop value for the communication, modifying a virtual destination hardware address, or otherwise modify the communication header. Alternatively, some or all the emulation functionality can be performed by the destination Communication Manager module 109c after it receives the packet.

By providing logical networking functionality, the ONM system provides various benefits. For example, because the various Communication Manager modules manage the overlay virtual network and can emulate the functionality of logical networking devices, in certain embodiments specified networking devices do not need to be physically implemented to provide virtual computer networks, allowing greater flexibility in the design of virtual user networks. Additionally, corresponding modifications to the interconnection network 120 or switches 115a-115b are generally not needed to support particular configured network topologies. Nonetheless, a particular network topology for the virtual computer network can be transparently provided to the computing nodes and software programs of a virtual computer network.

Address Translation System

FIG. 2 is a block diagram schematic of illustrative components of an embodiment of an address translation system 200, which may be a portion of the ONM system described in FIG. 1. The address translation system comprises one or more physical computing nodes 203 for operating virtual machine instances, such as the computing nodes 105a of FIG. 1, an assignable address service 230 and one or more packet forwarding devices 235.

In some embodiments, a node manager 205 allows multiple operating systems to run concurrently on the computing node 203 through hardware virtualization. The node manager 205 can schedule across the physical CPU(s) of the computing node. The node manager can also provide guest operating systems with a virtual operating platform and the node manager may monitor the execution of the guest operating systems. Multiple instances of a variety of operating systems operating on one or more virtual machine instances (VMIs) 210, 215, 220 may share the virtualized hardware resources. In one embodiment, the node manager 205 comprises a hypervisor or virtual machine manager. In some embodiments, the node manager 205 comprises an ONM VM Communication Manager 109a of FIG. 1.

The node manager 205 may also comprise a first guest operating system or domain 0 (dom0), which may boot automatically when the hypervisor boots and receives management privileges and direct access to the physical hardware by default. The system administrator can use the node manager to manage guest operating systems or virtual machine instances.

In some embodiments, the node manager 205 comprises an address translation manager 225. The address translation manager 225 tracks connection state for the virtual machine instances 210, 215, 220 of the computing node 203. The connection state may be stored in a table or other data store, which may be located internally on the computing node 203 or externally, in some embodiments.

In FIG. 2, the computing node 203 is shown connected to an assignable address service 230 and one or more packet forwarding devices 235 via an internal network 240, such as a private network, local area network, subnetwork, or the interconnection network 120 of FIG. 1. Typically, a packet forwarding device 235 is an edge device on the network that processes packets going into and out of the network. In some embodiments, the packet forwarding devices 235 form a pool of devices 237 and the computing node 203 may utilize any one of the packet forwarding devices in the pool to perform address translation. The address translation system 200 may comprise of multiple packet forwarding devices 235 or pools of devices 237 that can handle communications from a plurality of computing nodes 205.

In some embodiments, the assignable address service 230 manages a pool of assignable addresses, such as IP addresses (e.g., IPv4 or IPv6), ports or socket addresses. The assignable address service 230 may maintain address assignments in a data store or other data structure, which may be similar to an address translation table 255. The assignable address service 230 can lease the assignable addresses to virtual machine instances or hosts in the internal network. The assignable address service 230 may also reserve some assignable addresses for on-demand allocation in case some hosts require more endpoints than others (e.g., generates more parallel connections to an external network 245). Typically, the address translation manager 225 is responsible for holding or maintaining the lease. The lease may be permanent in some embodiments. In some embodiments, the assignable address service is part of the ONM Communication Manager 150 or ONM System Manager 110 of FIG. 1. In an example scenario, the translation manager 225 requests an assignable address from the assignable address service 230 when it initializes a connection (e.g., when sending a TCP SYN packet) when no connection tracking data has yet been recorded for that connection.

The assignable address service 230 or the address translation manager 225 may maintain connection state information for virtual machine instance connections to the external network. The connection state information may be maintained in an address translation table 255, data store, or other data structure. In one embodiment, an entry on the translation table 255 comprises a virtual machine instance identifier, a virtual machine instance socket address, and/or an external socket address. The address translation table 255 may contain multiple entries. In some embodiments, the virtual machine instance identifier comprises a physical computing node address and a slot identifier. As a physical computing node may operate multiple virtual machine instances, the slot identifier allows virtual machine instances on the computing node to be distinguished from one another. In some embodiments, the external addresses and/or ports may be allocated to multiple virtual machine instances (e.g., virtual machine instances located on different computing nodes). In some embodiments, the address translation manager 225 or assignable address service 230 propagates information about the assignment of an external address and port to a particular virtual machine instance to other hosts, packet forwarding devices 235 or computing nodes 203 in the system.

In some embodiments, the address translation manager 225 is responsible for tracking or maintaining the address leases from the assignable address service 230. The address translation manager 225 maintains the address translation table 255 and may add an entry when a connection to the outside network is established and remove the entry when a connection is terminated. The address translation manager 225 may notify the assignable address service that the assignable address and/or port is free. In some embodiments, the assignable address service may track the address leases.

The packet forwarding devices 235 can provide address translation for packets travelling from the internal network 240 to external networks 245, such as public networks or the Internet. In some embodiments, a packet forwarding device may be incorporated in a gateway, router or other networking device.

In some embodiments, the packet forwarding device 235 comprises a table or data source having forwarding rules 236 based at least partly on assignment information for external addresses and ports to respective virtual machine instances. The packet forwarding device 235 can use the forwarding rules 236 to determine where to direct packets that it receives. For example, one forwarding rule may specify that a particular external address and port is associated with a particular virtual machine instance. The forwarding rule can include a virtual machine instance identifier, such as the internal IP address of the physical computing node associated with the virtual machine instance. The virtual machine instance identifier may also include a slot identifier for distinguishing virtual machine instances on a computing node.

In the following example scenario, references are made to packet headers, exemplary embodiments of which are presented in a packet header chart 250. The exemplary packet headers may correspond to one or more network packet headers of a packet. For example, source and destination address data are typically stored in multiple headers of a packet (e.g., TCP/IP or UPD/IP). The exemplary packet headers correspond to the packet headers of a packet at different stages (1-6) of the example scenario. As will be apparent, a packet may have multiple headers as packets may be encapsulated or decapsulated as it traverses networks. Thus, other packets headers may co-exist with the illustrated packet headers on the same packet.

In the example scenario, a virtual machine instance (VMI) 210 comprises an address, "VMI address," which may be an IP address or virtual network address. Programs operating on the virtual machine instance, such as a web browser or mail program, can use the VMI address to communicate with external computing nodes by generating packets comprising the VMI address and a destination address. At stage (1), the virtual machine instance generates an outgoing packet, such as TCP or UDP, comprising the VMI address and VMI-port as the source address and "DST address" and "DST-port" as the destination address. Typically, the VMI address is an internal network address and the DST address is an external network address. The packet is then communicated to the address translation manager 225. The address translation manager 225 then communicates with an assignable address service 230 to obtain an assignable external address and/or port.

The assignable address service 230 can lease or allocate an external address, "AA1 address," and port, "AA1-port," to the virtual machine instance 210. Typically, the AA1 address is a public network address. At stage (2), the address translation manager 225 performs port address translation on the packet by replacing the source address with the assigned external address and port and sends the packet to a packet forwarding device 235. The packet may be encapsulated by the node manager 205 to use a virtual address by a virtual address translation, such as that described in relation to FIG. 1. In some embodiments, the virtual addressing (e.g., encapsulation and decapsulation) provides a transport mechanism for sending packets through one or more intervening nodes that do not maintain port address translation data until it reaches a target node (e.g., the packet forwarding device 235) that does maintain port address translation data (e.g., forwarding rules 236) and is capable of handling the translated packet. In some embodiments, the address translation system 200 may use a substrate mapping (e.g., a 1-1 or 1-many mapping of endpoint substrate addresses) or tunnel to associate two endpoints (e.g., computing node 203 and packet forwarding device 235) on the network 240 in order to provide the transport mechanism (in addition or alternatively to using virtual addressing).

In some embodiments, the virtual machine instance 210 may be assigned to a particular packet forwarding device 235 or a particular pool of packet forwarding devices 237. In some embodiments, the address translation manager 225 may select a packet forwarding device randomly or with a hash function. In some embodiments, the address translation manager 225 or a load balancer may select a packet forwarding device 235 or a pool of devices 237 based at least partly on the amount of current traffic handled by the packet forwarding 235 devices in the address translation system 200. In cases where a packet forwarding device fails, the address translation manager 225 or load balancer may dynamically select another packet forwarding device.

When the packet forwarding device 235 receives the packet, the packet forwarding device may, optionally, validate the packet if it has a forwarding rule stored reflecting the port address translation for that packet. In some embodiments, the packet forwarding device 235 may drop the packet if no rule exists. In some embodiments, the packet forwarding device 235 may add a forwarding rule if no entry exists, for example, by contacting the assignable address service 230 to determine the virtual machine instance associated with the source address of the outgoing packet.

In some embodiments, the packet may include a PAT flag that can be used to indicate that port address translation is to be performed on the packet or that port address translation has been performed on the packet. The packet forwarding device 235 may use the flag to determine how to process the packet. For example, in some embodiments, the packet forwarding device 235 may handle both regular packets and already-translated packets and uses the PAT flag to distinguish between packet types.

At stage (3), the packet forwarding device 235 transmits the packet to an external computing node on an external network 245. As the source address of the packet in the example has already been translated, the packet forwarding device 235 does not further translate the packet header. The packet forwarding device 235 may encapsulate/decapsulate or add/remove headers to the packet, if needed, to send it to the next hop on its path to its destination.

At stage (4), when the external computing node responds with an incoming packet, the packet forwarding device 235 utilizes its stored forwarding rules to determine the virtual machine instance the packet is destined for. In this example, the incoming packet has as the source address the DST address and DST-port, with the destination address as the AA1 address and AA1-port. The packet forwarding device 235 can determine the destination internal address based at least partly on the forwarding rules and the destination address of the packet.

In some embodiments, if no forwarding rule exists for that packet, the packet forwarding device 235 drops the packet. In other embodiments, the packet forwarding device 235 performs port address translation if no forwarding rule exists for that packet.

At stage (5) the packet forwarding device 235 communicates the packet to the computing node 203 associated with the virtual machine instance 210 without performing port address translation on the packet. The packet forwarding device 235 may also set the PAT flag in the packet to indicate that PAT still needs to be performed.

When the incoming packet reaches the computing node 203, the address translation manager 205 processes the packet and may check for the PAT flag. In one embodiment, the presence of the PAT flag causes the address translation manager 225 to perform port address translation by translating the destination address of the packet based at least partly on connection tracking state data, such as that maintained in the address translation table 255. If no connection tracking data is found for the destination address, then the incoming packet may be discarded. In this example, AA1 address and AA1-port are translated to VMI address and VMI-port.

At stage (6), the address translation manager 225 communicates the packet to the virtual machine instance 210, which then processes the packet. For example, if the packet comprises web page data, a web browser program on the virtual machine instance can use the packet data to display a web page.

While the above example has been described as performing operations on addresses and ports, operations may be performed, in some embodiments, on addresses or ports, either singly or in combination. In some embodiments, all packet translation may be performed by the computing nodes 205 and not by the packet forwarding devices, while in other embodiments, only some packet translation on the address translation system 200 is performed by the computing nodes 205. Further, while the above example illustrates the address translation manager 225 as operating in a distributed manner (e.g., as a component of a computing node) the address translation manager 225 may be a centralized or nodal system, in some embodiments. In some embodiments, the functionality of the address translation manager 225 and assignable address service 230 may be combined in a single computing system or device.

In some embodiments, the address translation system 200 may be incorporated in a non-virtualized network system. For example, the non-virtualized network may comprise one or more packet forwarding devices 235 and one or more computing systems located away from the edge of the network (e.g., a host device having no direct connections to an external network), wherein port address translation is performed on one or more address translation managers 225 operating on the computing systems. In some embodiments, the address translation managers 225 may be incorporated in networking hardware devices, such as a network interface controller, switch, or router.

FIG. 3 schematically illustrates a flow diagram for an embodiment of a port address translation process for outgoing packets usable in the example systems described above. For ease of explanation, the process will be described herein as performed by the address translation manager 225 and packet forwarding device 235; however, the process may be performed wholly or partially by any other suitable computing device or system.

Beginning at block 305, the address translation manager 225 receives a packet from an associated virtual machine instance and determines an external address and port associated with the virtual machine instance. In one embodiment, the address translation manager 225 requests an available external address and port from an assignable address service 230 that manages a pool of external addresses and ports, for example, if the address translation manger 225 is initializing a connection. The address translation manager 225 may store connection state data comprising the association between the virtual machine instance and the external address and port in a data store. In some situations, the address translation manager 225 may determine the external address and port by accessing the data store, for example, where connection state data for that particular connection already exists (e.g., an ongoing connection). Based at least partly on an entry in the data store, the address translation manager 225 can determine external address and port associated with the virtual machine interface.

At block 310, the address translation manager 225 performs port address translation on the packet. The address translation manager modifies the packet received from the virtual machine instance by changing the packet source address, typically an internal address and port, to the external address and port. By performing translation at the address translation manager 225 and off-loading the processing and state tracking from the packet forwarding device 235, scalability, performance and reliability of the network may be increased, as discussed above.

At block 315, the address translation manager 225 can encapsulate the packet, for example, using the virtual networking address as described in FIG. 1. The address translation manager may optionally set a PAT flag. The PAT flag can be used to indicate whether PAT has been performed on the packet or whether PAT is to be performed on the packet.

At block 320, the address translation manager 225 communicates the packet to the packet forwarding device 235, which receives the packet and can decapsulate the packet. The packet may travel over one or more network nodes before reaching the packet forwarding device 235. The packet may be encapsulated/decapsulated one or more times before it reaches the packet forwarding device 235.

At block 325, the packet forwarding device 235 may optionally check the PAT flag and if set, validates the packet based at least partly on a forwarding rule for the source address, where the forwarding rule identifies an association between the virtual machine instance and the source address. If no forwarding rule is found for the source address, the packet forwarding device may drop the packet.

At block 330, the packet forwarding device 235 transmits the packet to an external node on an external network, directly or indirectly, using networking protocols. The external node may be a web server, mail server, or other computing node. Generally, the external node is a publicly addressed node. Typically, the packet forwarding device 235 transmits the packet without performing port address translation on the packet as port address translation has been performed already in block 310.

FIG. 4 schematically illustrates a flow diagram for an embodiment of a port address translation process for incoming packets usable in the example systems described above. For ease of explanation, the process will be described herein as performed by the address translation manager 225 and packet forwarding device 235; however, the process may be performed wholly or partially by any other suitable computing device or system.

Beginning at block 405, the packet forwarding device 235 receives an incoming packet from an external network 245, the packet comprising an external address and port associated with a virtual machine instance. Typically, the external address and port are the destination address and the destination port for the packet.

At block 410, the packet forwarding device 235 determines an internal address for a physical computing node associated with the virtual machine instance. The packet forwarding device 235 may access a data store comprising forwarding rules to determine the associated internal address.

At block 415, the packet forwarding device 235 can encapsulate the packet (e.g., to use a virtual address) and may optionally set a PAT flag. The PAT flag can be used to indicate that port address translation still needs to be performed on the packet.

At block 420, the packet forwarding device 235 communicates the packet to the address translation manager 225. At block 422, address translation manager 225 receives the packet and can decapsulate the packet. The packet may be transmitted over one or more network nodes before reaching the packet forwarding device 225. The packet may also be encapsulated/decapsulated one or more times, for example, as part of the virtual network addressing process described in relation to FIG. 1, before it reaches the address translation manager 225.

At block 425, the address translation manager 225 determines an internal address and port associated with the virtual machine instance. The address translation manager may determine the address and port by accessing an address translation table 255 containing a mapping of assigned external addresses and/or ports to internal addresses and/or ports. Based at least partly on an entry in the data store, the address translation manager 225 can determine internal address and port associated with the virtual machine interface.

At block 430, the address translation manager 225 performs port address translation on the packet. The address translation manager modifies the packet received from the virtual machine instance by changing the packet destination address, typically an external address and port, to the internal address and port.

At block 435, the address translation manager 225 communicates the packet to the virtual machine instance, which can then process the packet and use the data delivered by the packet.

While the above processes have been described as performing operations on addresses and ports, operations may be performed, in some embodiments, on addresses or ports, either singly or in combination. In addition, while above processes describe virtual machine instances as the source and destination of the packets, the packets may be sent by and received at other types of hosts, such as physical computing systems or devices.

Depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal. Data may be stored in various types of data stores, such as tables, files, databases, directories or the like.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements or states. Thus, such conditional language is not generally intended to imply that features, elements or states are in any way required for one or more embodiments or that one or more embodiments necessarily include logic for deciding, with or without author input or prompting, whether these features, elements or states are included or are to be performed in any particular embodiment. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system for performing address translation for packets, the system comprising:
   connection tracking data comprising associations between assignable public IP addresses and ports with internal IP addresses and ports;
   a packet forwarding device located at an edge of a network, the packet forwarding device configured to:
      receive a packet from an external network, the packet comprising a destination address and a source address, the destination address comprising an assignable public IP address and port associated with the network;
      determine a forwarding rule for the packet based at least partly on the destination address of the packet, the forwarding rule identifying a relationship between the assignable public address and port associated with the network with a first internal address for a computing node of the network; and
      based at least partly on the forwarding rule, communicate the packet to the computing node;
      wherein the packet forwarding device does not translate the destination address of the packet to an internal address and port; and
   a translation manager with access to the connection tracking data, the translation manager located on the computing node, the computing node remote from the packet forwarding device, the translation manager configured to:
      access the connection tracking data and select an entry identifying an association of the first internal IP address and port with the assignable public IP address and port of the destination address of the packet;
      determine a second internal IP address and port based at least partly on the entry, wherein the second internal IP address is associated with a virtual machine instance;
      modify the packet by changing the destination address of the packet to the second internal IP address and port with the assignable public IP address and port; and
      communicate the packet to the destination node.

2. The system of claim 1, wherein the destination node comprises the virtual machine instance operating on the computing node.

3. The system of claim 1, wherein the destination node comprises a program operating on the computing node.

4. The system of claim 1, wherein the external network is the Internet.

5. A system for performing address translation for packets, the system comprising:
   a packet forwarding device located at an edge of a network, the packet forwarding device configured to:
      receive a packet associated with the network, the packet sent to or received from an external network, the packet comprising an assignable public address and port associated with the network, the packet comprising a destination address and a source address;
      determine a forwarding rule for the packet based at least partly on the source address or destination address of the packet, the forwarding rule identifying a relationship between the public address and port associated with the network and an internal address on the network; and
      based at least partly on the forwarding rule, communicate the packet to a first computing node, the assignable public address and port of the packet untranslated by the packet forwarding device; and
   a translation manager in communication with the packet forwarding device, the translation manager remote from the packet forwarding device, the translation manager configured to:
      determine the assignable public address and port by accessing a data store providing associations between assignable public IP addresses and ports with internal IP addresses and ports;
      modify the packet by changing the destination address or source address of the packet to the assignable public address and port; and
      communicate the packet to a second computing node.

6. The system of claim 5, wherein the first computing node is an external computing node located on the external network.

7. The system of claim 6, wherein the second computing node is the packet forwarding device.

8. The system of claim 5, wherein the first computing node is a node associated with the internal address on the network identified by the forwarding rule.

9. The system of claim 5, wherein the first computing node comprises the translation manager.

10. The system of claim 9, wherein the second computing node is a virtual machine instance.

11. The system of claim 5, further comprising:
   an address translation service comprising a pool of assignable public addresses, the address translation service configured to allocate the assignable public addresses to one or more computing nodes of the network;

wherein the translation manager requests an assignable public address from the address translation service when the translation manager initializes a connection.

12. The system of claim 11, wherein the one or more computing nodes of the networks comprise one or more virtual machine instances.

13. A method for performing address translation, the method comprising:
receiving an outgoing packet from a virtual machine instance on an internal network, the outgoing packet having a source address and a destination address, the destination address corresponding to an external network;
determining an assignable public IP address and port associated with the virtual machine instance;
modifying the outgoing packet by changing the source address of the outgoing packet to the assignable public IP address and port, the outgoing packet modified remotely from an edge of the internal network; and
communicating the outgoing packet to an edge device of the network, the edge device configured to forward the packet to the destination address,
wherein at least said modifying is performed by a computing system comprising computer hardware.

14. The method of claim 13, wherein said modifying the outgoing packet comprises setting a flag in the packet to indicate that the port address translation has been performed on the packet.

15. The method of claim 13, wherein said determining an assignable public IP address and port comprises:
accessing a data store comprising entries of associations between assignable public IP addresses and ports with virtual machine instances;
selecting an entry associated with the virtual machine instance; and
determining the assignable IP address and port based at least partly on the entry.

16. The method of claim 13, wherein said determining an assignable public IP address and port comprises requesting the assignable public IP address from an assignable address service.

17. The method of claim 13, wherein said determining an assignable IP address and port comprises:
accessing a data store comprising entries of associations between assignable public IP addresses and ports with virtual machine instances; and
storing an entry in the data store, the entry identifying an association between the virtual machine instance and the assignable public IP address.

18. The method of claim 13, wherein said communicating the outgoing packet to an edge device of the network comprises selecting the edge device from a plurality of edge devices.

19. The method of claim 18, wherein the edge device is selected using a hash function.

20. The method of claim 18, wherein the edge device is selected using a load balancer, the edge device selected based at least partly on the respective loads of the plurality of edge devices.

21. The method of claim 13, wherein said modifying the outgoing packet is performed remotely from the edge of the internal network at a host device having no direct connection to an external network.

22. The method of claim 13, further comprising encapsulating the packet with a packet header having a virtual network address associated with the edge device of the network.

23. The method of claim 13, wherein the computing system comprise a plurality of computing devices.

24. Non-transitory physical computer storage having stored thereon instructions that, when executed, direct a computing system to perform operations, the operations comprising:
receiving an incoming packet from an edge device located on an edge of a private network, the incoming packet having a source address and a destination address, the destination address comprising a public IP address and port associated with the private network;
determining a computing node on the private network associated with the public IP address and port, wherein the computing node is a virtual machine instance executing on the computing system;
determine a private IP address and port associated with the computing node; and
modifying the incoming packet by changing the destination address of the packet to the private IP address and port associated with the computing node, the incoming packet modified by the computing system remotely from an edge of the internal network.

25. The non-transitory physical computer storage of claim 24, wherein the operations further comprise communicating the outgoing packet to the computing node.

26. The non-transitory physical computer storage of claim 24, wherein said determining a computing node comprises:
accessing a data store comprising entries of associations between public IP addresses and ports with computing nodes;
selecting an entry associated with the public IP address and port of the destination address; and
determining the computing nodes associated with the public IP address.

27. The non-transitory physical computer storage of claim 24, the operations comprising decapsulating the packet to remove a packet header having a virtual network address associated with the computing system.

28. The non-transitory physical computer storage of claim 24, wherein the computing system does not have a direct connection to an external network.

29. The non-transitory physical computer storage of claim 24, in combination with a physical computer system configured to implement the operations.

30. The non-transitory physical computer storage of claim 24, wherein the computing device comprises a plurality of virtual machine instances.

* * * * *